US012694326B2

(12) United States Patent
Liu et al.

(10) Patent No.: US 12,694,326 B2
(45) Date of Patent: Jul. 28, 2026

(54) METHOD, ELECTRONIC DEVICE, AND COMPUTER PROGRAM PRODUCT FOR MANAGING INFERENCE PROCESS

(71) Applicant: EMC IP Holding Company LLC, Hopkinton, MA (US)

(72) Inventors: Jinpeng Liu, Shanghai (CN); Bin He, Shanghai (CN); Zijia Wang, WeiFang (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1252 days.

(21) Appl. No.: 17/528,942

(22) Filed: Nov. 17, 2021

(65) Prior Publication Data

US 2023/0128271 A1 Apr. 27, 2023

(30) Foreign Application Priority Data

Oct. 21, 2021 (CN) .......................... 202111228606.7

(51) Int. Cl.
G06N 20/00 (2019.01)
G06F 18/20 (2023.01)
H04L 67/51 (2022.01)
(52) U.S. Cl.
CPC ............. G06N 20/00 (2019.01); G06F 18/29 (2023.01); H04L 67/51 (2022.05)
(58) Field of Classification Search
CPC .......... G06N 20/00; G06N 3/08; G06N 3/063; G06F 18/29; H04L 67/51; G06V 20/54
See application file for complete search history.

(56) References Cited

U.S. PATENT DOCUMENTS 11,061,731 B2 7/2021 Zhao et al.
11,551,144 B2 * 1/2023 Foerster ................ G06F 9/5066
(Continued)

FOREIGN PATENT DOCUMENTS

CN 109902819 A 6/2019
CN 111507476 A 8/2020
(Continued)

OTHER PUBLICATIONS

Jia et al. ("Beyond Data and Model Parallelism for Deep Neural Networks", Proceedings of the 2nd SysML Conference, Palo Alto, CA, USA, 2019) (Year: 2019).*
(Continued)

*Primary Examiner* — Imad Kassim
(74) *Attorney, Agent, or Firm* — Ryan, Mason & Lewis, LLP

(57) ABSTRACT

Implementations of the present disclosure relate to a method, an electronic device, and a computer program product for managing an inference process. Here, the inference process is implemented based on a machine learning model. A method includes: determining, based on a computational graph defining the machine learning model, dependency relationships between a set of functions for implementing the inference process; acquiring, in at least one edge device located in an edge computing network, a set of computing units available to execute the inference process; selecting at least one computing unit for executing the set of functions from the set of computing units; and causing the at least one computing unit to execute the set of functions based on the dependency relationships. With example implementations of the present disclosure, the inference process is implemented by making use of a variety of computing units in the edge computing network, thereby improving performance.

20 Claims, 5 Drawing Sheets

(56) References Cited

U.S. PATENT DOCUMENTS

| | | | | |
|---|---|---|---|---|
| 2004/0078538 | A1* | 4/2004 | Dutt | G06F 8/451 |
| | | | | 711/158 |
| 2005/0039180 | A1 | 2/2005 | Fultheim et al. | |
| 2019/0324810 | A1 | 10/2019 | Zhao et al. | |
| 2020/0249998 | A1* | 8/2020 | Che | G06N 3/045 |
| 2020/0334083 | A1 | 10/2020 | Liu et al. | |
| 2020/0334544 | A1 | 10/2020 | Liu et al. | |
| 2021/0034582 | A1 | 2/2021 | Liu et al. | |
| 2021/0216367 | A1* | 7/2021 | Vee | G06F 16/9024 |
| 2021/0240525 | A1 | 8/2021 | Liu et al. | |
| 2021/0248002 | A1 | 8/2021 | Li et al. | |
| 2021/0303344 | A1 | 9/2021 | Li et al. | |
| 2022/0366217 | A1* | 11/2022 | Singh | G06N 3/08 |
| 2022/0366220 | A1* | 11/2022 | Roth | G06N 3/09 |
| 2024/0095581 | A1* | 3/2024 | Shi | G06N 20/00 |

FOREIGN PATENT DOCUMENTS

| | | |
|---|---|---|
| CN | 112306468 A | 2/2021 |
| CN | 112540854 A | 3/2021 |
| CN | 113412493 A | 9/2021 |

OTHER PUBLICATIONS

Qu et al. ("IDEC: Intelligent Distributed Edge Computing System Architecture Enabling Deep Learning across Heterogeneous IoT Devices", 2020 IEEE) (Year: 2020).*

Li et al. ("Edge AI: On-Demand Accelerating Deep Neural Network Inference via Edge Computing", vol. 19, No. 1, Jan. 2020) (Year: 2020).*

Chen et al. ("TVM: An Automated End-to-End Optimizing Compiler for Deep Learning", Oct. 8-10, 2018 • Carlsbad, CA, USA ISBN 978-1-939133-08-3) (Year: 2018).*

Wikipedia, "Intermediate Representation," https://en.wikipedia.org/w/index.php?title=Intermediate_representation&direction=next&oldid=905361000, Jan. 24, 2020, 4 pages.

Z. Jia et al., "Beyond Data and Model Parallelism for Deep Neural Networks," Proceedings of the 2nd SysML Conference, 2019, 13 pages.

Wikipedia, "Deep Learning," https://en.wikipedia.org/wiki/Deep_learning, Feb. 6, 2020, 33 pages.

Wikipedia, "Everything as a Service," https://simple.wikipedia.org/wiki/Everything_as_a_service, Aug. 23, 2019, 2 pages.

L. Song et al., "HyPar: Towards Hybrid Parallelism for Deep Learning Accelerator Array," arXiv:1901.02067v1, Jan. 7, 2019, 13 pages.

Github, "OpenNESS Architecture and Solution Overview," https://github.com/open-ness/specs/blob/master/doc/architecture.md, Accessed Jul. 6, 2020, 15 pages.

Amazon Web Services, "Machine Learning Inference with AWS IoT Greengrass Solution Accelerator" https://aws.amazon.com/iot/solutions/mli-accelerator/, Oct. 2019, 5 pages.

Y. Huang et al., "GPipe: Efficient Training of Giant Neural Networks using Pipeline Parallelism," arXiv:1811.06965v5, Jul. 25, 2019, 11 pages.

D. Narayanan et al., "PipeDream: Generalized Pipeline Parallelism for DNN Training," The 27th ACM Symposium on Operating Systems Principles, Oct. 27-30, 2019, 15 pages.

LLVM, "The LLVM Compiler Infrastructure," https://llvm.org/, Accessed Jul. 10, 2020, 3 pages.

LLVM, "Multi-Level Intermediate Representation Overview," https://mlir.llvm.org/, Accessed Jul. 10, 2020, 3 pages.

ONNX, "Open Neural Network Exchange," https://onnx.ai/, 2019, 3 pages.

Github, "ONNX: Open Standard for Machine Learning Interoperability," https://github.com/onnx/onnx, Accessed Jul. 10, 2020, 8 pages.

Github, "ONNX: Operators.md at Master," https://github.com/onnx/onnx/blob/master/docs/Operators.md, Accessed Jul. 10, 2020, 233 pages.

Github, "ONNX Runtime: Cross-Platform, High Performance ML Inferencing and Training Accelerator," https://github.com/microsoft/onnxruntime, Accessed Jul. 10, 2020, 10 pages.

Github, "LLVM Project: MLIR at Master," https://github.com/llvm/llvm-project/tree/master/mlir, Accessed Jul. 10, 2020, 2 pages.

C. Li et al., "Benanza: Automatic μBenchmark Generation to Compute 'Lower-bound' Latency and Inform Optimizations of Deep Learning Models on GPUs," arXiv:1911.06922v3, Feb. 19, 2020, 11 pages.

Github, "ONNX: Protobufs.ipynb at master," https://github.com/onnx/onnx/blob/master/onnx/examples/Protobufs.ipynb, Accessed Nov. 12, 2021, 8 pages.

U.S. Appl. No. 16/925,864 filed in the name of Jinpeng Liu et al. filed Jul. 10, 2020, and entitled "Managing Artificial Intelligence Model Partitions for Edge Computing Environment."

U.S. Appl. No. 17/029,769 filed in the name of Jinpeng Liu et al. filed Sep. 23, 2020, and entitled "Decoupled Architecture for Artificial Intelligence Model Management."

U.S. Appl. No. 17/082,867 filed in the name of Jinpeng Liu et al. filed Oct. 28, 2020, and entitled "Method, Electronic Device, and Computer Program Product for Processing Machine Learning Model."

U.S. Appl. No. 17/129,222 filed in the name of Jinpeng Liu et al. filed Dec. 21, 2020, and entitled "Method, Electronic Device, and Computer Program Product for Deploying Machine Learning Model."

Chinese Search Report of Application No. 2021112286067 dated Jan. 26, 2026, 2 pages.

* cited by examiner

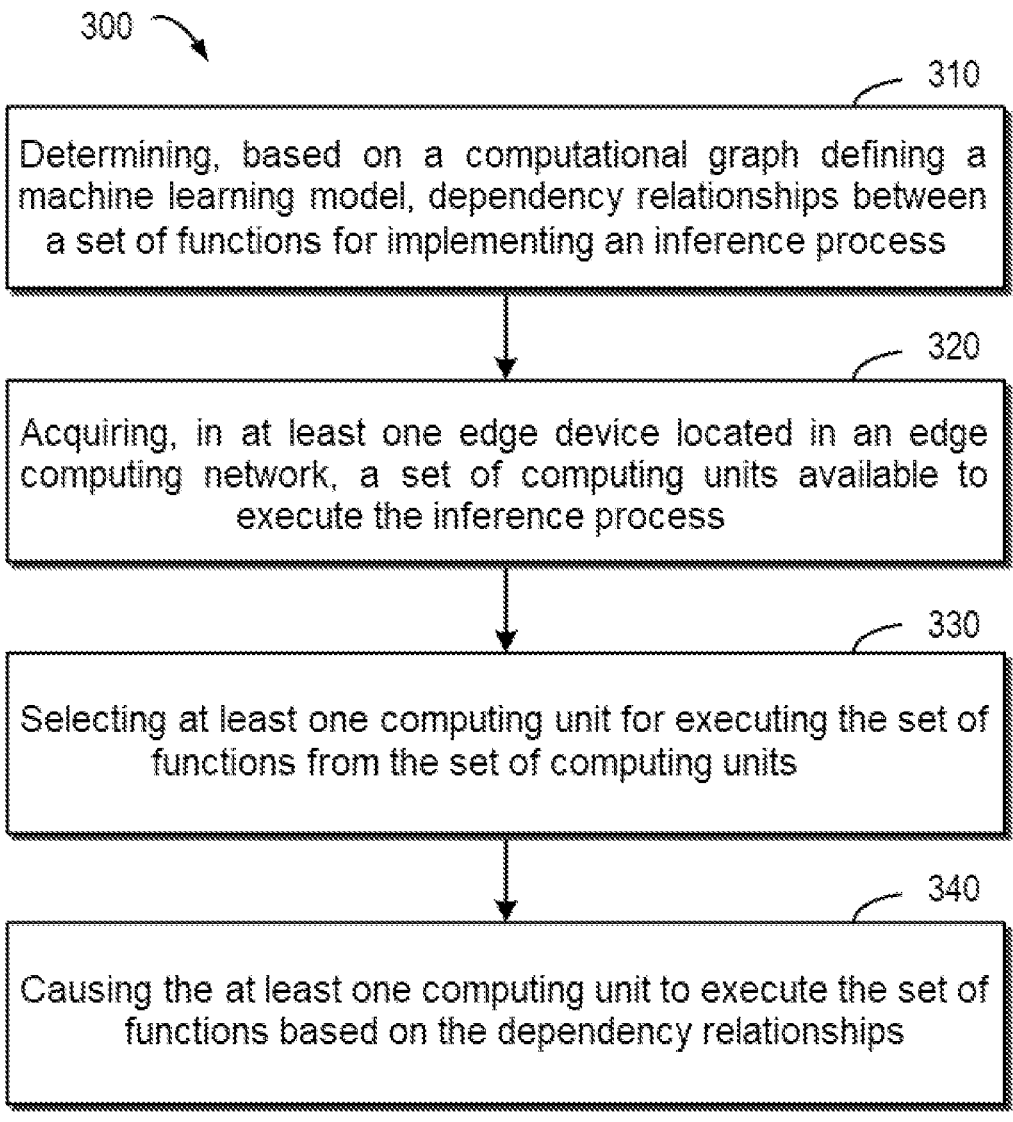

300

310

Determining, based on a computational graph defining a machine learning model, dependency relationships between a set of functions for implementing an inference process

320

Acquiring, in at least one edge device located in an edge computing network, a set of computing units available to execute the inference process

330

Selecting at least one computing unit for executing the set of functions from the set of computing units

340

Causing the at least one computing unit to execute the set of functions based on the dependency relationships

FIG. 3

METHOD, ELECTRONIC DEVICE, AND COMPUTER PROGRAM PRODUCT FOR MANAGING INFERENCE PROCESS

RELATED APPLICATION(S)

The present application claims priority to Chinese Patent Application No. 202111228606.7, filed Oct. 21, 2021, and entitled "Method, Electronic Device, and Computer Program Product for Managing Inference Process," which is incorporated by reference herein in its entirety.

FIELD

Implementations of the present disclosure relate generally to the field of machine learning, and specifically to a method, an electronic device, and a computer program product for managing an inference process based on a machine learning model.

BACKGROUND

In recent years, with the progress of artificial intelligence technologies, machine learning technologies have promoted the development of many fields. At the same time, machine learning models also become more and more complex, which leads to a large amount of computing resources of many types being involved in the training of machine learning models and in subsequent inference processes using machine learning models. Technical solutions have been proposed to train machine learning models by using dedicated computing resources in cloud environments and to use the trained machine learning models for inference. With the development of hardware technologies and edge computing technologies, various edge devices have been equipped with computational and storage capabilities. At this point, how to utilize resources of these edge devices to execute an inference process has become an important research topic.

SUMMARY

Implementations of the present disclosure provide a method, an electronic device, and a computer program product for managing an inference process.

In a first aspect of the present disclosure, a method for managing an inference process is provided, the inference process being implemented based on a machine learning model. In the method, dependency relationships between a set of functions for implementing the inference process are determined based on a computational graph defining the machine learning model. A set of computing units available to execute the inference process are acquired in at least one edge device located in an edge computing network. At least one computing unit for executing the set of functions is selected from the set of computing units. The at least one computing unit is caused to execute the set of functions based on the dependency relationships.

In a second aspect of the present disclosure, an electronic device is provided. The device includes: at least one processing unit; and at least one memory coupled to the at least one processing unit and storing instructions for execution by the at least one processing unit to cause the electronic device to perform the method according to the first aspect of the present disclosure.

In a third aspect of the present disclosure, a computer program product is provided. The computer program product is tangibly stored on a non-transitory computer-readable medium and includes machine-executable instructions, wherein the machine-executable instructions are used to execute the method according to the first aspect of the present disclosure.

This Summary is provided in order to introduce the selection of concepts in a simplified form, which will be further described in the Detailed Description below. The Summary is neither intended to identify key features or essential features of implementations of the present disclosure, nor intended to limit the scope of implementations of the present disclosure.

BRIEF DESCRIPTION OF THE DRAWINGS

The above and other objectives, features, and advantages of the present disclosure will become more apparent from the following description of example implementations of the present disclosure, in combination with the accompanying drawings. In the example implementations of the present disclosure, the same reference numerals generally represent the same parts.

FIG. 3 illustrates a flow chart of a method for managing an inference process according to an implementation of the present disclosure;

Identical or corresponding numerals represent identical or corresponding parts in various accompanying drawings.

DETAILED DESCRIPTION

Example implementations of the present disclosure will be described in more detail below with reference to the accompanying drawings. Although example implementations of the present disclosure are shown in the accompanying drawings, it should be understood that the present disclosure may be implemented in various forms and should not be limited by the implementations set forth herein. Rather, these implementations are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example implementation" and "an implementation" mean "at least one implementation." The term "another implementation" means "at least one additional implementation." The terms "first," "second," and the like may refer to different or identical objects. Other definitions, both explicit and implicit, may be included below.

Machine learning technologies have been used in a wide variety of industries. For example, multiple types of collection devices (e.g., video collection devices, etc.) may be deployed in a factory production line environment to collect image information of various objects. Further, machine learning technologies may be used to monitor whether the production line is operating normally. For another example, image collection devices may be deployed in road traffic networks to monitor the operation state of a road traffic system, and so on.

Technical solutions have been proposed to execute an inference process in a variety of environments. In a cloud computing environment, computing nodes in a cluster usually have the same configuration, i.e., having the same operating system, architecture, and accelerator, and sufficient computing resources have been reserved in advance for machine learning-related computing tasks. When a computing node in the cluster fails, a backup computing node may replace the failed computing node. At this point, the backup computing node has the same configuration as the failed computing node, and the machine learning-related applications developed for computing nodes may run normally on the backup computing node.

Figure 1:
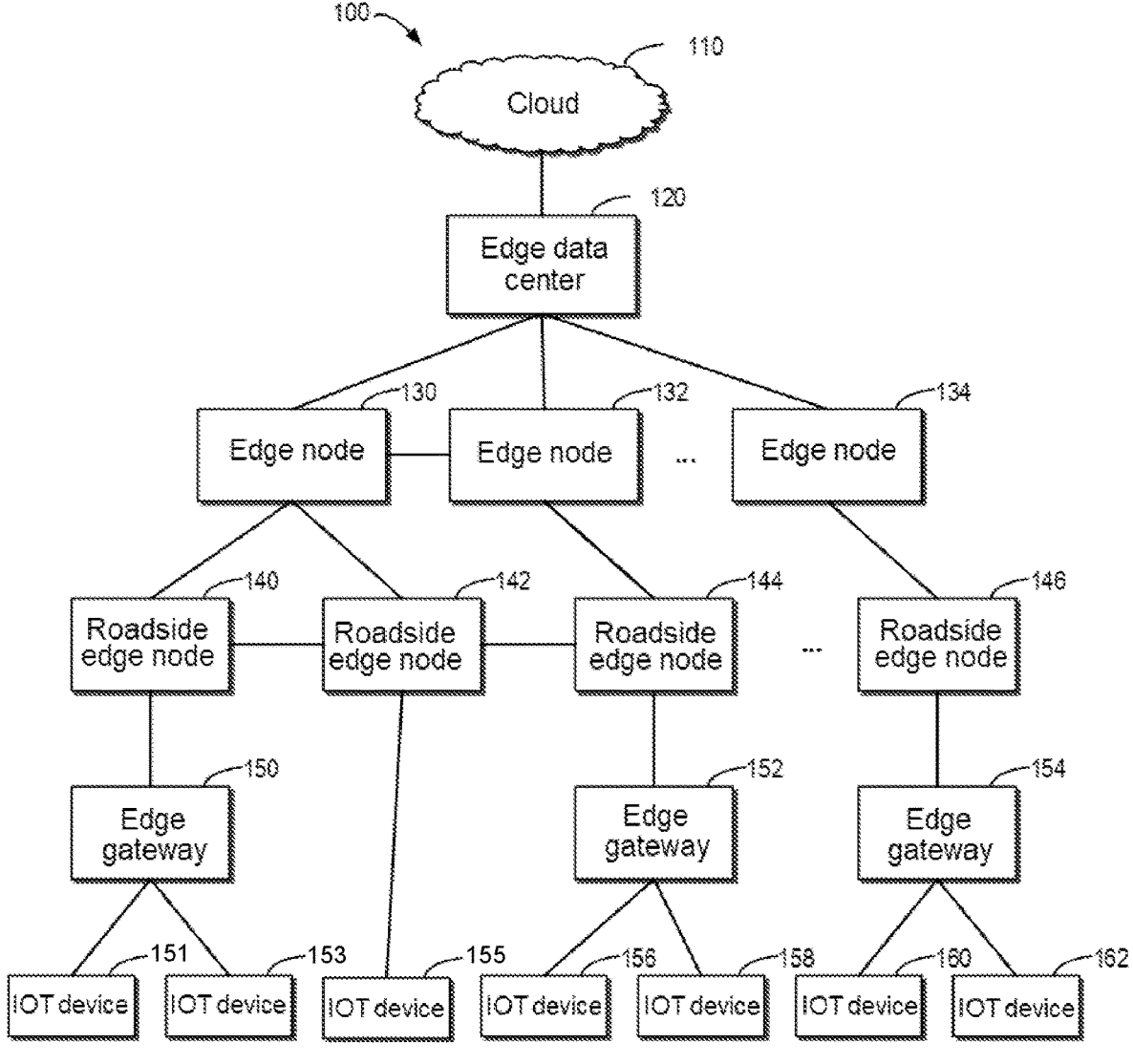
FIG. 1 illustrates a schematic diagram of an example environment in which the device and/or method according to implementations of the present disclosure may be implemented.

With the development of hardware technologies and the promotion of edge computing technologies, more and more edge devices begin to have a certain amount of computing resources and storage resources. FIG. 1 illustrates a schematic diagram of example environment 100 in which the device and/or method according to implementations of the present disclosure may be implemented. As shown in FIG. 1, edge data center 120 may be connected to cloud 110, and there may be a plurality of edge nodes 130, 132, . . . , and 134 below edge data center 120. Further, there may be roadside edge nodes 140, 142, 144, . . . , and 146 below the edge nodes. There may be lower-layer edge devices, for example, edge gateways 150, 152, . . . , and 154, IoT (Internet of Things) devices 151, 153, 155, 156, 158, 160, and 162, and so on.

As shown in FIG. 1, the network below edge data center 120 may be referred to as an edge computing network, and devices in that network may be referred to collectively as edge devices. Unlike the computing nodes in cloud 110, the edge devices typically have completely different configurations in terms of hardware, such as involving central processing unit (CPU) architectures, graphics processing unit (GPU) accelerators, reduced instruction set computers (RISC), field-programmable gate arrays (FPGA), system-on-chips (SoCs), etc., from different manufacturers. In addition, the edge devices may have different operating systems, deep learning framework stacks, and so on, in terms of software. Computing resources of the edge devices are usually very limited, and the resources of the edge devices are gradually reduced in an order from top to bottom in FIG. 1.

In order to fully utilize computing resources of the edge devices, it is expected that inference tasks may be performed at the edge devices. At this point, dedicated code has to be developed for each type of edge device and compiled executable programs need to be deployed to the edge devices one by one. This results in a need for a large amount of manual operations during the program deployment and update processes. Thus, it is expected that the resources of various edge devices may be invoked in a uniform and more effective manner to perform inference tasks.

For ease of description, only a video surveillance system deployed in a traffic network is used as an example in the context of the present disclosure to describe details of the implementation of an inference process. According to an example implementation of the present disclosure, image data along a road may be collected. A machine learning model for recognizing abnormal vehicles may be pre-trained, and the machine learning model may be directly invoked during the inference phase to execute the inference process and thus to recognize whether there are abnormal vehicles in the traffic network.

Typically, data collected from image collection devices of the Internet of Things must be processed locally at the image collection locations for data security and privacy regulation reasons. Therefore, the image recognition process (i.e., the inference process) can only be performed locally. Assuming that the training of the machine learning model has been completed in a cloud, then the trained machine learning model may be deployed in the edge network in order to perform local image recognition.

In general, in addition to an inference module based on the machine learning model, the video surveillance system also needs to interact with other external systems. For example, after detecting an abnormal vehicle, it may interact with other systems such as a geographic information system (GIS) and a database system storing historical image data, in order to perform further tracking based on acquired geographic location and timestamp information. Specifically, the video surveillance system may be implemented based on the following modules:

North interface: which receives the trained machine learning model from the cloud, reports an inference result to the cloud, and interacts with the GIS and the database system, etc.

South interface: which processes data from a variety of image collection devices.

Horizontal interface: which communicates with other edge nodes to perform data collaboration.

Internal scheduling model: video surveillance must support processing of inference tasks from a plurality of priorities. For example, an inference task for tracking hit-and-run vehicles may have a high priority, an inference task for detecting minor vehicle violations may have a low priority, and so on.

Video/image pre-processing module: which processes the collected data, performs enhancement processing of video frames when necessary, and so on.

Inference module: which detects abnormal vehicles according to the trained machine learning model.

Post-processing module: which tracks abnormal vehicles by interacting with other different edge nodes.

When the above video surveillance system is run in the edge computing network, there may be a variety of interactions among a large number of modules, and the inference module is only one among the large number of modules. Thus, the inference process should be subject to the scheduling by a main application of the video surveillance system and serve the video surveillance system. At this point, the inference module is not the center of the video surveillance system, nor can it control the operation of other modules of the video surveillance system. According to the conventional development mode for machine learning related applications, the definition of the model, the computational implementation, and its scheduling scheme are implemented as a whole in a single runtime process (thread). This leads to unsatisfactory inference in heterogeneous edge environments.

Existing machine learning frameworks cannot provide custom scheduling schemes, but rely on manual code writing. For example, if it is expected that the inference process is executed at edge devices based on different hardware architectures (e.g., CPU, GPU, FPGA, etc.), dedicated code must be written for each hardware architecture. Further, in order to improve inference performance using parallel algorithms such as data parallelism, model parallelism, and pipeline parallelism, separate settings must be made for invoking various parallel algorithms. This results in the user having to write dedicated code to achieve desired functions.

In order to at least partially solve one or more of the above problems and other potential problems, implementations of the present disclosure provide an open and dynamic scheduler architecture for an inference process. The scheduler architecture may dynamically configure current edge devices (e.g., including hardware and software configurations) based on necessary information (e.g., a computational graph) obtained from the front end to dynamically adjust the relevant processing manner during the inference process. For example, parallel algorithms such as data parallelism, model parallelism, and pipeline parallelism may be utilized to achieve higher inference efficiency. Further, target code may be generated by a code generation unit at the back end of the scheduler architecture, so as to invoke different edge devices to execute the inference process.

According to an example implementation of the present disclosure, the above scheduler architecture is more suitable for edge computing environments. To facilitate maintenance, various functions of the scheduler architecture may be implemented in a dynamic link library. As a result, the main application of the video surveillance system may invoke the dynamic link library and thus integrate a variety of functions into the main application efficiently. With the development of machine learning standardization, the scheduler architecture according to an example implementation of the present disclosure may provide a uniform invoking interface for the implementation of the inference module so as to execute the inference process on different types of hardware devices.

Figure 2:
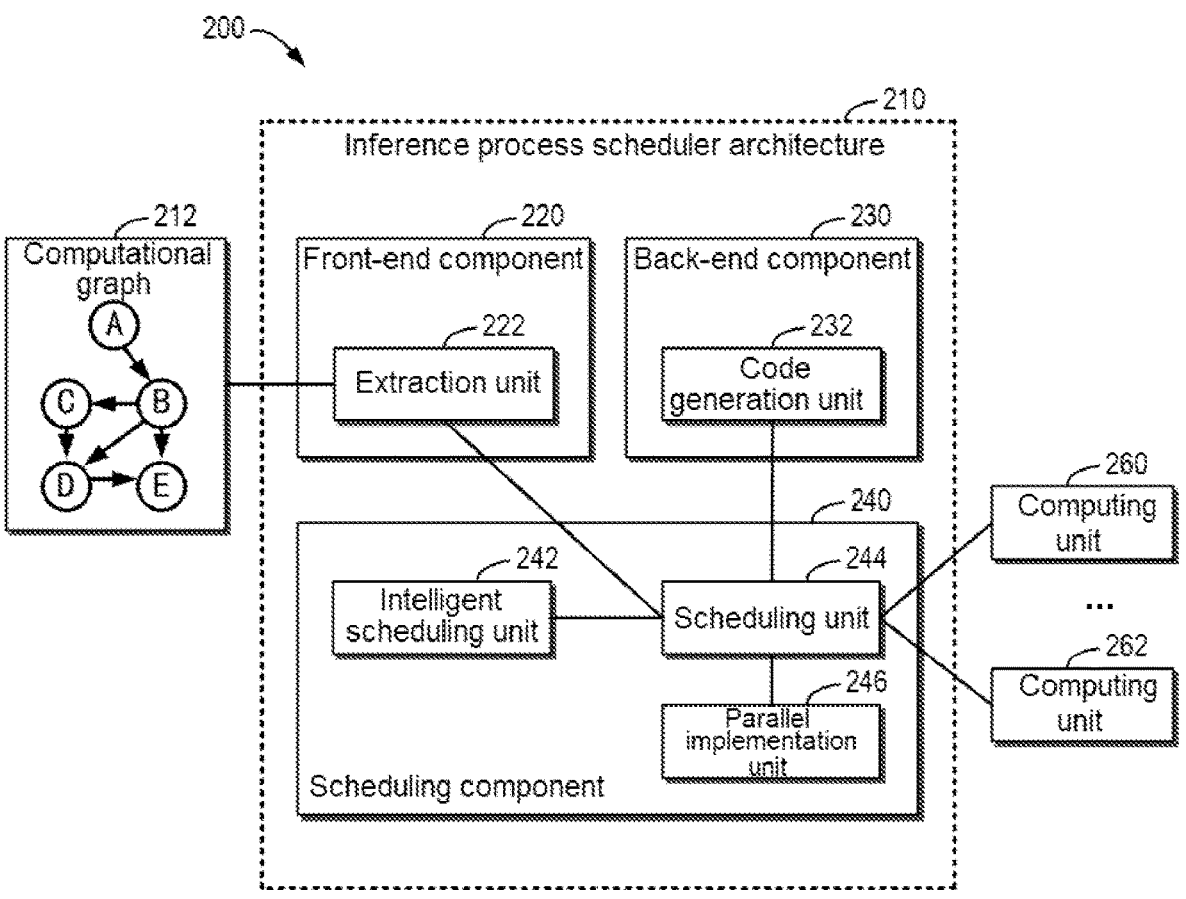
FIG. 2 illustrates a block diagram of an inference process scheduler architecture according to an implementation of the present disclosure.

Hereinafter, an overview of the scheduler architecture will be described first with reference to FIG. 2. FIG. 2 illustrates block diagram 200 of inference process scheduler architecture 210 according to an implementation of the present disclosure. The architecture may encapsulate various functions related to the inference process and provide a dedicated interface for executing the inference process to the main application that invokes the inference process. Specifically, the architecture may include front-end component 220, back-end component 230, and scheduling component 240.

As shown in FIG. 2, front-end component 220 may provide interaction with the machine learning model. For example, extraction unit 222 may extract dependency relationships between functions from computational graph 212 of the machine learning model, so as to facilitate subsequent implementation, in accordance with the dependency relationships, of the inference process defined by the machine learning model. It will be understood that the edge device may include a variety of computing units based on different architectures, for example, X86 architecture-based CPU computing units, ARM-based CPU computing units, NVPTX-based GPU computing units, OpenCL-based cross-platform computing units, TPU-based dedicated computing units, FPGAs, SoCs, and so on. Here, back-end component 230 may provide functions associated with code generation. Specifically, code generation unit 232 in back-end component 230 may generate matching program code according to the type of each computing unit.

Scheduling component 240 may schedule the specific execution of the functions defined by computational graph 212. For example, intelligent scheduling unit 242 may determine the configuration of the computing units based on the configuration of the machine learning model. Scheduling unit 244 may determine one or more computing units 260, . . . , and 262 that are currently available, specify a computing unit that may be used to execute the inference process, and notify code generation unit 232 to generate corresponding code in accordance with the type of the specified computing unit. Further, scheduling unit 244 may notify the specified computing unit to run the code generated by code generation unit 232 in order to implement the inference process. Scheduling unit 244 is illustratively associated with a parallel implementation unit 246.

With the example implementation of the present disclosure, inference process scheduler architecture 210 can compile all components involved in the inference process, including front-end component 220, back-end component 230, and scheduling component 240, into the format of a dynamic link library. For example, the .dll format may be used in a Windows operating system, and the .so format may be used in a Linux operating system. In this way, the inference module related to the machine learning model in the video surveillance system can be controlled independently, and the inference process can be easily loaded into the main application of the video surveillance system. At this point, the main application may execute the inference process by invoking the above inference process scheduler architecture 210.

Hereinafter, more details of the inference process according to an example implementation of the present disclosure will be described with reference to FIG. 3. FIG. 3 illustrates a flow chart of method 300 for managing an inference process according to an implementation of the present disclosure. At block 310, dependency relationships between a set of functions for implementing the inference process may be determined based on computational graph 212 defining the machine learning model. Returning to FIG. 2, more details of computational graph 212 will be described. Here, computational graph 212 may include computational graphs stored in a variety of formats that are currently known and/or to be developed in the future.

Nodes in computational graph 212 may indicate a plurality of functions for implementing the inference process, and directed edges between the nodes may indicate dependency relationships between the functions. For example, node A may indicate one operation type (e.g., convolution), node B may indicate another operation type (e.g., matrix summation), and the directed edge between node A and node B may indicate that: the matrix summation operation needs to be performed after the convolution operation. According to an example implementation of the present disclosure, the dependency relationships between the set of functions may be determined based on the nodes and directed edges in computational graph 212.

Returning to FIG. 3, at block 320, a set of computing units available to execute the inference process may be acquired in at least one edge device located in an edge computing network. According to an example implementation of the present disclosure, a list including all available computing units in the edge computing network may be acquired. Here, the list may include a variety of types of computing units. In general, different types of computing units have different computational capabilities and are thus suitable for executing different types of functions.

At block 330, at least one computing unit for executing the set of functions is selected from the set of computing units. A corresponding computing unit may be selected based on the operation type of a function. Specifically, in order to select the at least one computing unit, for a function in the set of functions, the operation type of the function may be determined. Further, a computing unit for performing the function may be selected from the set of computing units based on the operation type.

According to an example implementation of the present disclosure, a computing unit configuration describing a mapping between functions of the operation type and computing units may be provided. For example, it may be specified that the convolution operation is handled by a CPU architecture-based computing unit, the matrix summation operation is handled by a GPU architecture-based computing unit, and so on. At this point, a computing unit corresponding to the operation type may be selected from the set of computing units currently available based on the computing unit configuration. According to an example implementation of the present disclosure, different computing units may be selected from the list for executing different functions in the set of functions, respectively. In this way, computing units with good performance may be selected for each function respectively, thereby improving the efficiency of the inference process.

At block 340, the at least one computing unit may be caused to execute the set of functions based on the dependency relationships. Specifically, the functions in the set of functions may be executed serially and in sequence according to the dependency relationships. According to an example implementation of the present disclosure, in order to improve the performance of the inference process, a plurality of parallel functions in the set of functions that can be executed in parallel may be determined based on the dependency relationships. It will be understood that processing may be performed based on a plurality of parallel algorithms. For example, parallel functions that may be executed in parallel may be determined using any algorithm in data parallel algorithm, model parallel algorithm, and pipeline parallel algorithm.

Further, the at least one target computing unit is used to execute the plurality of parallel functions in parallel, so as to achieve the purpose of improving inference performance. Functions other than the plurality of parallel functions in the set of functions may be executed serially using the at least one computing unit and based on the dependency relationships.

According to an example implementation of the present disclosure, inference process scheduler architecture 210 allows automatic determination of parallel algorithms in order to optimize the inference process. Alternatively and/or additionally, inference process scheduler architecture 210 further allows a user to customize which parallel algorithms to use. For example, a user may provide a parallel algorithm configuration for executing the inference process. The configuration may define: the use of one or more algorithms in data parallel algorithm, model parallel algorithm, and pipeline parallel algorithm.

According to an example implementation of the present disclosure, inference process scheduler architecture 210 allows a user to specify an input queue for storing to-be-processed data associated with the inference process. For example, the input queue may be specified to be located within a certain address space of the edge device running the main application. Further, the selected at least one computing unit may be instructed to execute the inference process for the to-be-processed data in the input queue. Assuming that the input queue has an address range from 0x001 . . . 00 to 0x00f . . . ff, then the computing unit may be notified to read to-be-processed image data from that address range.

According to an example implementation of the present disclosure, inference process scheduler architecture 210 allows a user to specify an output queue for storing the inference result generated by the inference process. Further, inference process scheduler architecture 210 may notify the at least one computing unit to store the inference result generated by the inference process to the output queue. Alternatively and/or additionally, a notification may be provided when the input queue and/or the output queue is ready.

With the example implementation of the present disclosure, by invoking inference process scheduler architecture 210, a user does not need to care about details of the inference process, but can instead directly use the functions provided by the architecture to select computing units, select parallel algorithms, and select where to read data to be processed and where to retrieve inference results.

Figure 4:
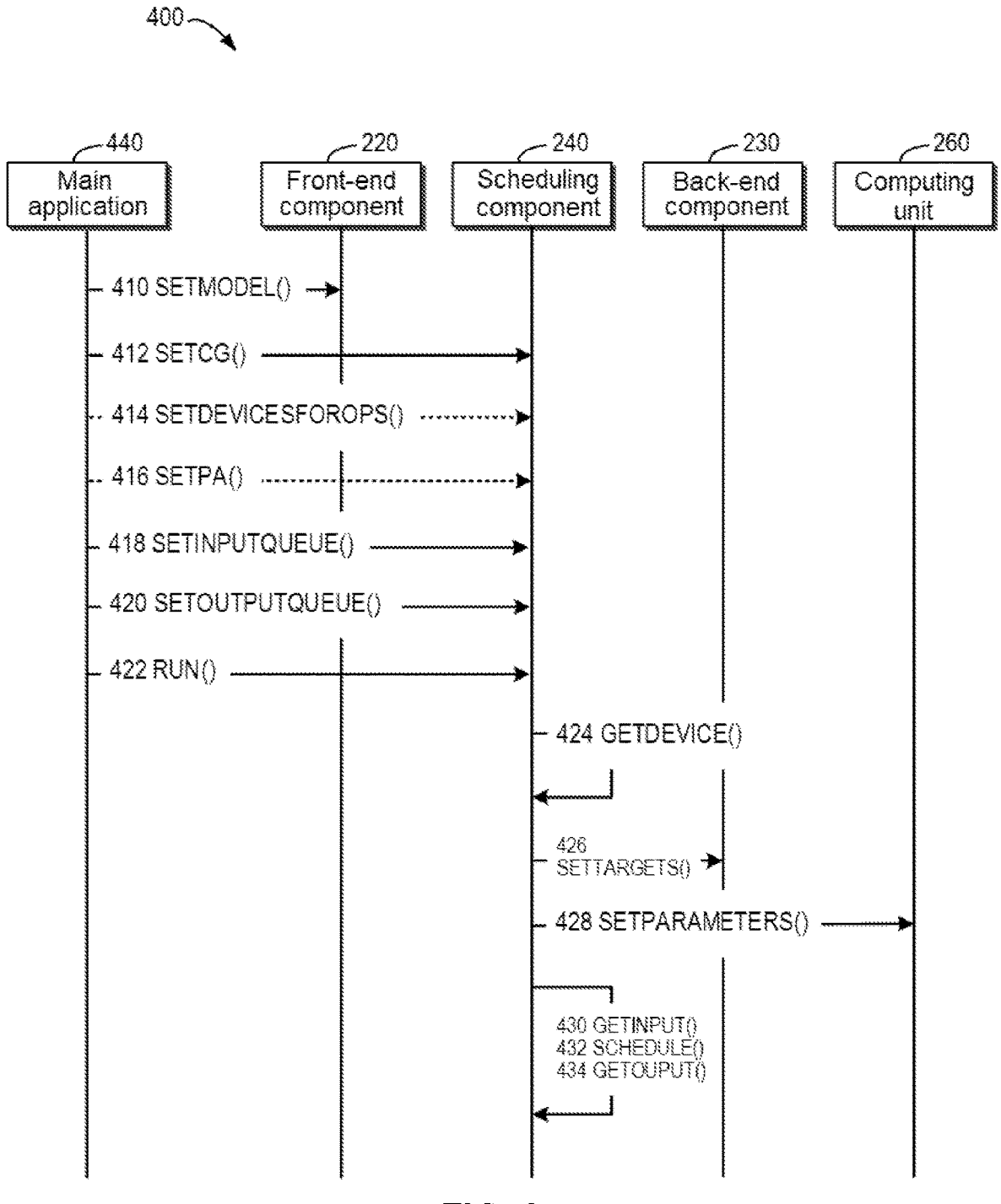
FIG. 4 illustrates a block diagram of the interaction between a main application and a plurality of components involved in an inference process according to an implementation of the present disclosure.

According to an example implementation of the present disclosure, the method described above may be implemented based on an application programming interface defined in a dynamic link library. Specifically, the method described above may be invoked by a main application that uses the inference process. Hereinafter, more details of using a main application to invoke the method described above will be described with reference to FIG. 4. FIG. 4 illustrates block diagram 400 of the interaction between a main application and a plurality of components involved in an inference process according to an implementation of the present disclosure.

According to an example implementation of the present disclosure, main application 440 may invoke inference process scheduler architecture 210 via the dynamic link library described above. Specifically, after the initialization process, main application 440 may invoke 410 the application programming interface SetModel( ) to use front-end component 220 of inference process scheduler architecture 210. For example, various data associated with the machine learning model may be input to front-end component 220. At this point, front-end component 220 may parse computational graph 212 from the received input data and extract related dependency relationships and other configuration parameters.

When SetModel( ) returns, the main application 440 may invoke 412 the application programming interface SetCG( ) in order to use scheduling component 240 to load computational graph 212 obtained by front-end component 220 into scheduling component 240, so as to learn about functions involved in the machine learning model and the dependency relationships between the functions. According to an example implementation of the present disclosure, the selection of specified computing units to execute the functions may be supported. For example, main application 440 may invoke 414 the application programming interface SetDevicesForOPs( ) to specify computing units for different functions. It will be understood that the step of invoking the application programming interface SetDevicesForOPs( ) is optional, and in the absence of a pre-specified correspondence relationship between functions and computing units, any currently available computing unit may be selected by default to execute one or more functions.

According to an example implementation of the present disclosure, computational graph 212 may include multiple types of functions. At this point, main application 440 may provide a computing unit configuration file. For example, it is possible to specify, according to the storage capacity, the computing performance, and other parameters of each computing unit, which functions the computing unit is suitable for executing, and it is also possible to specify the maximum size of the data to be processed. Scheduling component 240 may allocate corresponding computing units to the functions based on the computing unit configuration file.

Here, the computing unit configuration file may pre-specify the correspondence relationship between functions and computing units. For example, if historical experience shows that CPU performs convolution operations more efficiently, it may be specified that convolution operations are performed by CPU. For another example, it may be specified that matrix summation and/or other operations are performed, for example, by GPU. With the example imple-mentation of the present disclosure, certain dedicated com-puting units (e.g., SoC chips embedded in image collection devices) can be specified to share the computational load of the inference process, thereby allowing edge devices with higher computational capabilities to focus on other complex tasks.

According to an example implementation of the present disclosure, it is possible to support the execution of some functions in parallel. For example, main application 440 may invoke 416 the application programming interface SetPA( ) to notify scheduling component 240 of whether to execute parallel algorithms and which parallel algorithm(s) to use. For example, model parallelism and a list of com-puting units may be specified, and scheduling component 240 may be caused to perform model parallel computations in parallel on a plurality of computing units. According to an example implementation of the present disclosure, it is also possible to specify that the inference process is executed based on a data parallelism manner. By default, scheduling component 240 may execute the inference process in local computing units based on pipeline parallelism.

According to an example implementation of the present disclosure, it is possible to allow the specifying of storage locations of input data and output data. For example, main application 440 may invoke 418 the application program-ming interface SetInputQueue( ) to specify from where the computing units acquire the input data to be processed. In addition, main application 440 may invoke 420 the appli-cation programming interface SetOutputQueue( ) to specify to where the computing units output the processing result. Further, a notification may be provided when the input queue and/or output queue is ready. Specifically, when the input queue is ready, the computing unit may be notified to read processing from the input queue for processing. Alterna-tively and/or additionally, when the output queue is ready, other computing units for performing subsequent functions may be notified to read processing from the output queue.

For the video surveillance system described above, the video/image pre-processing module may output its process-ing result to the specified input queue and send a notification to the inference module to wake up an input thread that is dormant on the input queue. Alternatively and/or addition-ally, an IoT sensor may store the collected data to the input queue without sending a notification. At this point, the input thread of the inference module may read data from the input queue during a predetermined cycle process for use in subsequent processing. According to an example implemen-tation of the present disclosure, in the video surveillance system, when the processing is completed, the processing result may be stored to the output queue. Further, a notifi-cation may be sent to prompt subsequent processing mod-ules to read it.

Details of various resources required to configure the inference process have been described above, and hereinaf-ter, how the inference process is performed will be described. According to an example implementation of the present disclosure, main application 440 may invoke 422 the application programming interface Run( ) to execute, based on the data in the input queue, the inference process defined by computational graph 212. At this point, main application 440 may execute the inference process independently using the functionality provided by inference process scheduler architecture 210 and acquire the inference result from the output queue.

During execution of the inference process, scheduling component 240 may determine, in accordance with a pre-defined parallel algorithm configuration file, whether to perform parallel processing. If that parallel algorithm con-figuration file has defined the parallel processing manner, at least any of a data parallel algorithm, a model parallel algorithm, and a pipeline parallel algorithm may be executed in accordance with that definition. Otherwise, the default pipeline parallel algorithm may be used to execute the functions in each pipeline in parallel, thereby improving the performance of the inference process.

According to an example implementation of the present disclosure, scheduling component 240 may schedule 424 the application programming interface GetDevice( ) in order to acquire a list of all available computing units from the MEC (Multi-Access Edge Computing) Advanced Hardware Extension interface of an edge device. Further, scheduling component 240 may invoke 426, based on this list and the predefined computing unit configuration file, the application programming interface SetTargets( ) to specify the corre-sponding computing units. If this configuration file exists, scheduling component 240 may follow the definition of the configuration file to specify certain function(s) in the infer-ence process to be performed by the computing unit defined in the configuration file. If the configuration file does not exist, scheduling component 240 may automatically allocate computing units. Prior to the specific execution of the function, scheduling component 240 may invoke 428 the application programming interface SetParameters( ) to copy parameters pre-trained for different functions to correspond-ing computing units.

At this point, scheduling component 240 may instruct computing unit 260 to use the received parameters to execute a corresponding function on the data at a specified location in the input queue according to the acquired depen-dency relationship. Specifically, scheduling component 240 may initiate a cycle process in which the application pro-gramming interface GetInput( ) is invoked 430 to read data from the input queue, the application programming interface Schedule( ) is invoked 432 to instruct the corresponding computing unit 260 to execute the inference process, and the application programming interface GetOutput( ) is invoked 434 to acquire an inference result from the output queue.

With the example implementation of the present disclo-sure, a more flexible process invoking interface can be defined by implementing the above inference process sched-uler architecture 210 in a dynamic link library. This allows a user to easily load the inference process associated with the machine learning model into main application 440. For example, the application programming interface defined in the dynamic link library may be invoked in the video surveillance application described above, which in turn allows inference process scheduler architecture 210 to auto-matically implement the inference process. At this point, the user does not need to care about the specific scheduling method within the inference process, but only needs to input the data to be processed to the inference module based on the input queue, and then the corresponding inference result can be acquired from the output queue.

In this way, the user can focus more on the logical process of the main application without intertwining the functions of the inference module with other logical modules. In this way, the user can focus on programming the main application without having to constantly perform the repetitive manual labor of copying and pasting the code associated with the inference process. Further, since inference process scheduler architecture 210 has been encapsulated into the dynamic link library, the user only needs to invoke the application programming interface in the relevant source code of the inference module, which may significantly reduce the complexity of the source code associated with the inference module and maintain the source code in a simpler and more efficient manner.

With the example implementation of the present disclosure, the user can customize multiple aspects of details related to the inference process. For example, the user may specify an address of the input queue where the data to be processed is stored, may specify an address of the output queue where the inference result is stored, may specify a type of computing unit that performs the inference process, may specify whether to perform parallel processing, and so on. Further, inference process scheduler architecture 210 also provides a default processing approach, so that the inference process can be executed in accordance with the default mode in the event that the user is not familiar with the customized configuration.

With the example implementation of the present disclosure, inference process scheduler architecture 210 can automatically select, based on the current state of the edge devices, one or more computing units to execute the inference process. For example, the execution efficiency of the inference process can be improved by selecting idle computing units with high computational capabilities and/or executing the computation in a parallel manner. Further, the computing units here are available computing resources obtained in real time, which does not require additional programming work to be performed when moving the main application forward from one geographic location to another.

With the example implementation of the present disclosure, inference process scheduler architecture 210 can provide uniform support for different types of computing units. For example, the architecture may support X86 architecture-based CPU computing units, ARM-based CPU computing units, NVPTX-based GPU computing units, OpenCL-based cross-platform computing units, TPU-based dedicated computing units, SoCs, and so on. As the hardware performance of edge devices is enhanced, certain operations involved in the inference process can be offloaded to the computing units of an edge device (e.g., SoC in an IoT collection device). In this way, inference process scheduler architecture 210 can automatically schedule the inference process without requiring a vendor of a computing unit to develop a separate framework program related to the machine learning model.

It will be understood that the method of implementing an inference process in an edge computing network is described above using only a video surveillance system as an example. According to an example implementation of the present disclosure, the inference process may be implemented in other systems. For example, in a system for monitoring a factory production line, a machine learning model may be trained to recognize non-conforming products. At this point, based on the inference process scheduler architecture of the present disclosure, the inference process for recognizing non-conforming products can be performed at a computing unit in, for example, an image collection device and/or other gateway devices.

Examples of the method according to the present disclosure have been described in detail above with reference to FIGS. 2 to 4, and implementations of the corresponding apparatus will be described below. Specifically, an apparatus for managing an inference process is provided. The inference process is implemented based on a machine learning model, and the apparatus includes: a determination module configured to determine, based on a computational graph defining the machine learning model, dependency relationships between a set of functions for implementing the inference process; an acquisition module configured to acquire, in at least one edge device located in an edge computing network, a set of computing units available to execute the inference process; a selection module configured to select at least one computing unit for executing the set of functions from the set of computing units; and an execution module configured to cause the at least one computing unit to execute the set of functions based on the dependency relationships. According to an example implementation of the present disclosure, the above apparatus further includes modules for executing other steps in method 300.

Figure 5:
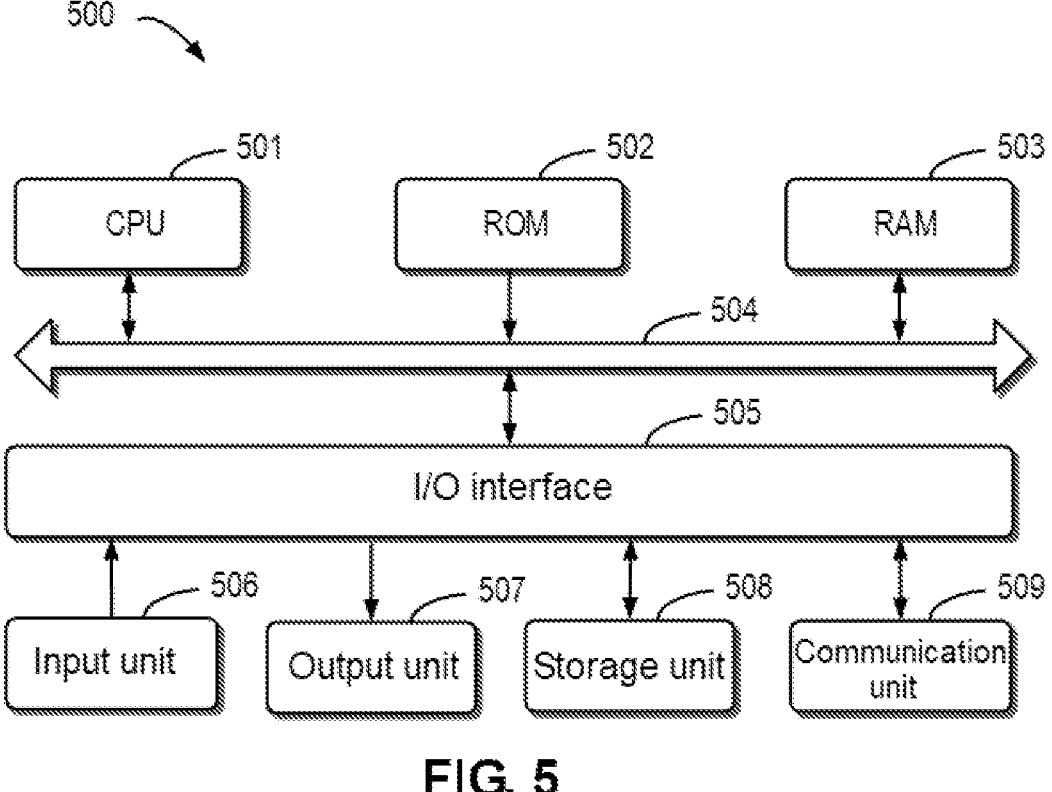
FIG. 5 illustrates a block diagram of an example device that may be used to implement implementations of the present disclosure.

FIG. 5 schematically illustrates a block diagram of device 500 for managing an inference process according to an example implementation of the present disclosure. As shown, device 500 includes general processing unit (CPU) 501 which can perform various appropriate actions and processes according to computer program instructions stored in read only memory (ROM) 502 or computer program instructions loaded from storage unit 508 into random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing procedures described above, such as method 300, may be performed by CPU 501. For example, in some implementations, the method mentioned above may be implemented as a computer software program that is tangibly included in a machine-readable medium, for example, storage unit 508. In some implementations, part of or all the computer program may be loaded and/or installed onto device 500 via ROM 502 and/or communication unit 509. When the computer program is loaded into RAM 503 and executed by CPU 501, one or more steps of the methods described above may be performed. Alternatively, in other implementations, CPU 501 may also be configured in any other suitable manner to implement the above process/method.

According to an example implementation of the present disclosure, an electronic device is provided, including: at least one processor; and a memory coupled to the at least one processor, wherein the memory has instructions stored therein which, when executed by the at least one processor, cause the device to perform actions for managing an inference process. Here, the inference process is implemented based on a machine learning model, and the actions include: determining, based on a computational graph defining the machine learning model, dependency relationships between a set of functions for implementing the inference process; acquiring, in at least one edge device located in an edge computing network, a set of computing units available to execute the inference process; selecting at least one computing unit for executing the set of functions from the set of computing units; and causing the at least one computing unit to execute the set of functions based on the dependency relationships.

According to an example implementation of the present disclosure, selecting the at least one computing unit includes: determining, for a function in the set of functions, an operation type of the function; and selecting, based on the operation type, a computing unit for executing the function from the set of computing units.

According to an example implementation of the present disclosure, selecting the at least one computing unit further includes: acquiring a computing unit configuration describing a mapping between functions of the operation type and computing units; and selecting, based on the computing unit configuration, a computing unit corresponding to the operation type from the set of computing units.

According to an example implementation of the present disclosure, selecting the at least one computing unit includes: selecting, from the set of computing units, different computing units for executing different functions in the set of functions, respectively.

According to an example implementation of the present disclosure, causing the at least one computing unit to execute the set of functions includes: determining, based on the dependency relationships, a plurality of parallel functions in the set of functions that can be executed in parallel; executing the plurality of parallel functions in parallel using the at least one target computing unit; and executing, based on the dependency relationships, other functions than the plurality of parallel functions in the set of functions serially using the at least one computing unit.

According to an example implementation of the present disclosure, determining the plurality of parallel functions includes: acquiring a parallel algorithm configuration for executing the inference process, the parallel algorithm configuration comprising at least any one of the following: a data parallel algorithm, a model parallel algorithm, and a pipeline parallel algorithm; and determining the plurality of parallel functions based on the parallel algorithm configuration.

According to an example implementation of the present disclosure, causing the at least one computing unit to execute the set of functions includes: specifying an input queue for storing to-be-processed data associated with the inference process; and causing the at least one computing unit to execute the inference process for the to-be-processed data in the input queue.

According to an example implementation of the present disclosure, causing the at least one computing unit to execute the set of functions includes: specifying an output queue for storing an inference result generated by the inference process; and causing the at least one computing unit to store the inference result generated by the inference process to the output queue.

According to an example implementation of the present disclosure, the actions are implemented based on an application programming interface defined in a dynamic link library, and the actions are invoked by a main application that uses the inference process.

According to an example implementation of the present disclosure, the set of computing units includes a hardware architecture based on at least any one of the following: a central processing unit, a graphics processing unit, a dedicated hardware accelerator, a field programmable gate array, and a system on chip.

According to an example implementation of the present disclosure, a computer program product is provided, the computer program product being tangibly stored on a non-transitory computer-readable medium and including machine-executable instructions, wherein the machine-executable instructions are used to execute the method according to the present disclosure.

According to an example implementation of the present disclosure, a computer-readable medium is provided, the computer-readable medium storing machine-executable instructions which, when executed by at least one processor, cause the at least one processor to implement the method according to the present disclosure.

Illustrative embodiments of the present disclosure include be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable disc read-only memory (CD-ROM), a digital compact disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The above description is illustrative and not exhaustive, and is not limited to the various implementations disclosed. Numerous modifications and alterations will be apparent to persons of ordinary skill in the art without departing from the scope and spirit of the illustrated implementations. The selection of terms as used herein is intended to best explain principles and practical applications of the various implementations or improvements to technologies on the market, so as to enable persons of ordinary skill in the art to understand the implementations disclosed herein.

What is claimed is:

1. A method for managing an inference process, the inference process being implemented based on a machine learning model, the method comprising:

determining, in a front-end stage of a processor-based multi-stage scheduler architecture, based on extraction from a computational graph defining the machine learning model, dependency relationships between a set of functions for implementing the inference process, the processor-based multi-stage scheduler architecture further comprising a scheduling stage and a back-end stage that includes a code generator, the scheduling stage being coupled to the front-end stage and the back-end stage;

acquiring, in at least one edge device located in an edge computing network, a set of computing units available to execute the inference process;

determining, in the scheduling stage of the processor-based multi-stage scheduler architecture, the set of computing units of the at least one edge device, at least in part by invoking at least a first application programming interface configured to obtain from the at least one edge device, via at least one multi-access edge computing interface of the at least one edge device, information characterizing available computing units of the at least one edge device;

selecting, in the scheduling stage of the processor-based multi-stage scheduler architecture, at least one computing unit for executing the set of functions from the set of computing units, at least in part by invoking one or more additional application programming interfaces different than the first application programming interface, wherein the scheduling stage is further configured to control the code generator of the back-end stage to generate code for executing the set of functions on the selected at least one computing unit; and causing the at least one computing unit to execute the set of functions based on the dependency relationships utilizing the code generated by the code generator of the back-end stage.

2. The method according to claim 1, wherein selecting the at least one computing unit comprises:

determining, for a function in the set of functions, an operation type of the function; and selecting, based on the operation type, a computing unit for executing the function from the set of computing units.

3. The method according to claim 2, wherein selecting the at least one computing unit further comprises:

acquiring a computing unit configuration describing a mapping between functions of the operation type and computing units; and selecting, based on the computing unit configuration, a computing unit corresponding to the operation type from the set of computing units.

4. The method according to claim 1, wherein selecting the at least one computing unit comprises: selecting, from the set of computing units, different computing units for executing different functions in the set of functions, respectively.

5. The method according to claim 1, wherein causing the at least one computing unit to execute the set of functions comprises:

determining, based on the dependency relationships, a plurality of parallel functions in the set of functions that can be executed in parallel;

executing the plurality of parallel functions in parallel using the at least one computing unit; and executing, based on the dependency relationships, other functions than the plurality of parallel functions in the set of functions serially using the at least one computing unit.

6. The method according to claim 5, wherein determining the plurality of parallel functions comprises:

acquiring a parallel algorithm configuration for executing the inference process, the parallel algorithm configuration comprising at least any one of the following: a data parallel algorithm, a model parallel algorithm, and a pipeline parallel algorithm; and determining the plurality of parallel functions based on the parallel algorithm configuration.

7. The method according to claim 1, wherein causing the at least one computing unit to execute the set of functions comprises:

specifying an input queue for storing to-be-processed data associated with the inference process; and causing the at least one computing unit to execute the inference process for the to-be-processed data in the input queue.

8. The method according to claim 1, wherein causing the at least one computing unit to execute the set of functions comprises:

specifying an output queue for storing an inference result generated by the inference process; and causing the at least one computing unit to store the inference result generated by the inference process to the output queue.

9. The method according to claim 1, wherein the method is implemented based on an application programming interface defined in a dynamic link library, and the method is invoked by a main application that uses the inference process.

10. The method according to claim 1, wherein the set of computing units comprises a hardware architecture based on at least any one of the following: a central processing unit, a graphics processing unit, a dedicated hardware accelerator, a field programmable gate array, and a system on chip.

11. An electronic device, comprising:

at least one processor; and memory coupled to the at least one processor, wherein the memory has instructions stored therein which, when executed by the at least one processor, cause the electronic device to perform actions for managing an inference process, the inference process being implemented based on a machine learning model, and the actions comprising:

determining, in a front-end stage of a processor-based multi-stage scheduler architecture, based on extraction from a computational graph defining the machine learning model, dependency relationships between a set of functions for implementing the inference process, the processor-based multi-stage scheduler architecture further comprising a scheduling stage and a back-end stage that includes a code generator, the scheduling stage being coupled to the front-end stage and the back-end stage;

acquiring, in at least one edge device located in an edge computing network, a set of computing units available to execute the inference process;

determining, in the scheduling stage of the processor-based multi-stage scheduler architecture, the set of computing units of the at least one edge device, at least in part by invoking at least a first application programming interface configured to obtain from the at least one edge device, via at least one multi-access edge computing interface of the at least one edge device, information characterizing available computing units of the at least one edge device;

selecting, in the scheduling stage of the processor-based multi-stage scheduler architecture, at least one computing unit for executing the set of functions from the set of computing units, at least in part by invoking one or more additional application programming interfaces different than the first application programming interface, wherein the scheduling stage is further configured to control the code generator of the back-end stage to generate code for executing the set of functions on the selected at least one computing unit; and causing the at least one computing unit to execute the set of functions based on the dependency relationships utilizing the code generated by the code generator of the back-end stage.

12. The electronic device according to claim 11, wherein selecting the at least one computing unit comprises:

determining, for a function in the set of functions, an operation type of the function; and selecting, based on the operation type, a computing unit for executing the function from the set of computing units.

13. The electronic device according to claim 12, wherein selecting the at least one computing unit further comprises:

acquiring a computing unit configuration describing a mapping between functions of the operation type and computing units; and selecting, based on the computing unit configuration, a computing unit corresponding to the operation type from the set of computing units.

14. The electronic device according to claim 11, wherein selecting the at least one computing unit comprises: selecting, from the set of computing units, different computing units for executing different functions in the set of functions, respectively.

15. The electronic device according to claim 11, wherein causing the at least one computing unit to execute the set of functions comprises:

determining, based on the dependency relationships, a plurality of parallel functions in the set of functions that can be executed in parallel;

executing the plurality of parallel functions in parallel using the at least one computing unit; and executing, based on the dependency relationships, other functions than the plurality of parallel functions in the set of functions serially using the at least one computing unit.

16. The electronic device according to claim 15, wherein determining the plurality of parallel functions comprises:

acquiring a parallel algorithm configuration for executing the inference process, the parallel algorithm configuration comprising at least any one of the following: a data parallel algorithm, a model parallel algorithm, and a pipeline parallel algorithm; and determining the plurality of parallel functions based on the parallel algorithm configuration.

17. The electronic device according to claim 11, wherein causing the at least one computing unit to execute the set of functions comprises:

specifying an input queue for storing to-be-processed data associated with the inference process; and causing the at least one computing unit to execute the inference process for the to-be-processed data in the input queue.

18. The electronic device according to claim 11, wherein causing the at least one computing unit to execute the set of functions comprises:

specifying an output queue for storing an inference result generated by the inference process; and causing the at least one computing unit to store the inference result generated by the inference process to the output queue.

19. The electronic device according to claim 11, wherein the actions are implemented based on an application programming interface defined in a dynamic link library, and the actions are invoked by a main application that uses the inference process; and the set of computing units comprises a hardware architecture based on at least any one of the following: a central processing unit, a graphics processing unit, a dedicated hardware accelerator, a field programmable gate array, and a system on chip.

20. A computer program product comprising a non-transitory computer-readable medium having machine-executable instructions stored therein, wherein the machine-executable instructions when executed cause at least one device to perform actions for managing an inference process, the inference process being implemented based on a machine learning model, the actions comprising:

determining, in a front-end stage of a processor-based multi-stage scheduler architecture, based on extraction from a computational graph defining the machine learning model, dependency relationships between a set of functions for implementing the inference process, the processor-based multi-stage scheduler architecture further comprising a scheduling stage and a back-end stage that includes a code generator, the scheduling stage being coupled to the front-end stage and the back-end stage;

acquiring, in at least one edge device located in an edge computing network, a set of computing units available to execute the inference process;

determining, in the scheduling stage of the processor-based multi-stage scheduler architecture, the set of computing units of the at least one edge device, at least in part by invoking at least a first application programming interface configured to obtain from the at least one edge device, via at least one multi-access edge computing interface of the at least one edge device, information characterizing available computing units of the at least one edge device;

selecting, in the scheduling stage of the processor-based multi-stage scheduler architecture, at least one computing unit for executing the set of functions from the set of computing units, at least in part by invoking one or more additional application programming interfaces different than the first application programming interface, wherein the scheduling stage is further configured to control the code generator of the back-end stage to generate code for executing the set of functions on the selected at least one computing unit; and causing the at least one computing unit to execute the set of functions based on the dependency relationships utilizing the code generated by the code generator of the back-end stage.

* * * * *